(12) United States Patent
Olson et al.

(10) Patent No.: US 11,275,014 B1
(45) Date of Patent: Mar. 15, 2022

(54) PARTICLE CHARACTERISTIC MEASUREMENT APPARATUS

(71) Applicants: Roy Olson, Sioux Falls, SD (US); Alex Pearson, Sioux Falls, SD (US); Joshua Tracy, Harrisburg, SD (US)

(72) Inventors: Roy Olson, Sioux Falls, SD (US); Alex Pearson, Sioux Falls, SD (US); Joshua Tracy, Harrisburg, SD (US)

( * ) Notice: Subject to any disclaimer, the term of this patent is extended or adjusted under 35 U.S.C. 154(b) by 0 days.

(21) Appl. No.: 17/246,872

(22) Filed: May 3, 2021

(51) Int. Cl.
*G01N 15/14* (2006.01)

(52) U.S. Cl.
CPC ... *G01N 15/1434* (2013.01); *G01N 2015/144* (2013.01); *G01N 2015/1493* (2013.01); *G01N 2015/1497* (2013.01)

(58) Field of Classification Search
CPC .................................................. G01N 15/1434
USPC ......................................................... 356/335
See application file for complete search history.

(56) References Cited

U.S. PATENT DOCUMENTS

| | | | |
|---|---|---|---|
| 4,842,406 A | 6/1989 | Vonbargen | |
| 4,917,496 A | 4/1990 | Sommer | |
| 5,426,501 A | 6/1995 | Hokanson | |
| 6,600,559 B2 | 7/2003 | Switalski | |
| 7,248,363 B2 | 7/2007 | Totoki | |
| 8,842,267 B2 | 9/2014 | Heine | |
| 2002/0149763 A1* | 10/2002 | Tsukada | G01N 15/042 356/73 |
| 2003/0137661 A1* | 7/2003 | Ortyn | G01N 15/147 356/338 |
| 2006/0055934 A1* | 3/2006 | Sunshine | G01N 21/85 356/446 |
| 2006/0134775 A1* | 6/2006 | Phillips | G01N 21/6445 435/287.2 |
| 2007/0046938 A1* | 3/2007 | Adams | G01N 15/147 356/343 |
| 2007/0205312 A1 | 9/2007 | Pierri | |
| 2011/0066382 A1* | 3/2011 | Adams | G01N 21/53 702/19 |
| 2011/0076668 A1* | 3/2011 | Oguro | B01F 11/0017 435/2 |
| 2013/0252237 A1* | 9/2013 | Wagner | G01N 15/1436 435/6.1 |
| 2015/0116708 A1 | 4/2015 | Spriggs | |
| 2016/0202164 A1* | 7/2016 | Trainer | G01N 15/0211 356/336 |
| 2016/0319270 A1* | 11/2016 | Lipkens | A61M 1/3678 |

(Continued)

FOREIGN PATENT DOCUMENTS

| | | | |
|---|---|---|---|
| CN | 201016915 | 2/2008 | |
| CN | 206132564 | 4/2017 | |
| JP | 2017096663 A * | 6/2017 | ............ G01N 15/02 |

(Continued)

*Primary Examiner* — Tarifur R Chowdhury
*Assistant Examiner* — Omar H Nixon
(74) *Attorney, Agent, or Firm* — Jeffrey A. Proehl; Woods, Fuller, Shultz & Smith, PC (57) ABSTRACT

An apparatus for sensing characteristics of particles in a flow of particles may include a guidance structure configured to guide particles of a stream of particles taken from the flow of particles. The guidance structure defines an inclined surface across which particles of the stream of particles move. The apparatus may further include an image capturing device configured to capture at least one image of particles located on the inclined surface.

12 Claims, 9 Drawing Sheets

(56) References Cited

U.S. PATENT DOCUMENTS

2016/0377525 A1\* 12/2016 Foster ................... B07C 5/3425
435/34

FOREIGN PATENT DOCUMENTS

| KR | 2018073117 | 7/2018 |
|----|------------|---------|
| WO | 200020837 | 4/2000 |
| WO | 2006117429 | 11/2006 |

\* cited by examiner

PARTICLE CHARACTERISTIC MEASUREMENT APPARATUS

BACKGROUND

Field

The present disclosure relates to particle analysis apparatus and more particularly pertains to a new particle characteristic measurement apparatus for facilitating more accurate particle characteristic sensing and measurement.

SUMMARY

In one aspect, the present disclosure relates to an apparatus for sensing characteristics of particles in a flow of particles. The apparatus may comprise a guidance structure configured to guide particles of a stream of particles taken from the flow of particles, and the guidance structure May define an inclined surface across which particles of the stream of particles move. The apparatus may also comprise an image capturing device configured to capture at least one image of particles located on the inclined surface.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 9 thereof, a new particle characteristic measurement apparatus embodying the principles and concepts of the disclosed subject matter will be described.

Sensing and measurement of various characteristics of particles before, during, and after the grinding of the particles by a grinding apparatus provides useful information for evaluating and adjusting various parameters of the grinding apparatus in order to achieve the desired size, size consistency, and even shape of the particles output by the grinding apparatus. Capturing images of particles ground by a grinding apparatus to measure and evaluate the characteristics of the particles, and ultimately the effectiveness of the grinding apparatus to achieve the desired particle characteristics, is known. However, the applicants have recognized that conventional practices for moving the particles by an image capturing device tend to produce less than optimal images due to, for example, variations in the distance between the image capturing device and the particles being imaged. For example, one approach is to capture images of individual particles freefalling in a cascade, but particles tend to move in downward paths that vary in proximity to the image capturing device. Another approach is to suspend the particles in a fluid that moves in a tube along a vertical path, but again this approach can produce variation in the distance between different particles in the flow and the image capturing device. Variations in proximity of the particles to the image capturing device can result in the images of many of the particles being outside of the optimal focal length of the image capturing device, and the images of some of the particles in the captured image being "out of focus" so that the outer boundaries of the particles in the image are less distinct or "fuzzy." Particles with less distinct outer boundaries in an image are more difficult for automated processes to recognize accurately and are thus less useful for determining characteristics of the particles, such as particle size.

The applicants have developed an approach for characteristic sensing, such as image capture, in which particles move across an inclined surface primarily under the influence of gravity, and during such movement images of the particles are captured for use in determining or measuring various characteristics of the particles. While the movement of the particles is downwardly under the influence of gravity, the path of movement of the particles (and thus the distance between the particles and the image capturing device) is constrained by the presence of the inclined surface, and movement of the particles off of or away from the inclined surface is discouraged by the effect of gravity on the particles. Using this technique, the path of movement of the particles is more controlled and more consistently maintained at the optimal focal length of the image capturing device, producing images of the particles with improved and more consistent clarity as compared to, for example, images of particles allowed to freefall in a cascade, or in a fluid flow, in front of the image capturing device.

Figure 1:
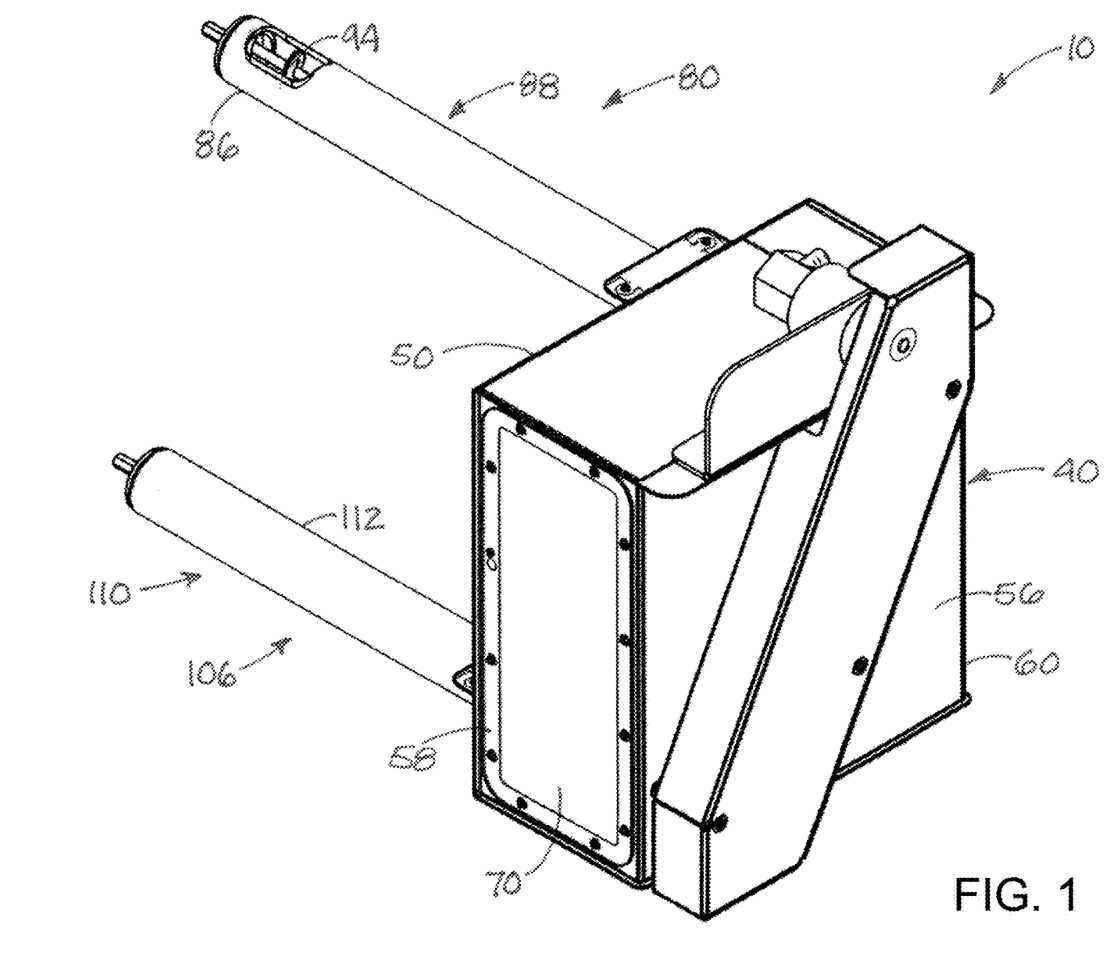
FIG. 1 is a schematic perspective view of a new particle characteristic measurement apparatus according to the present disclosure.
Figure 2:
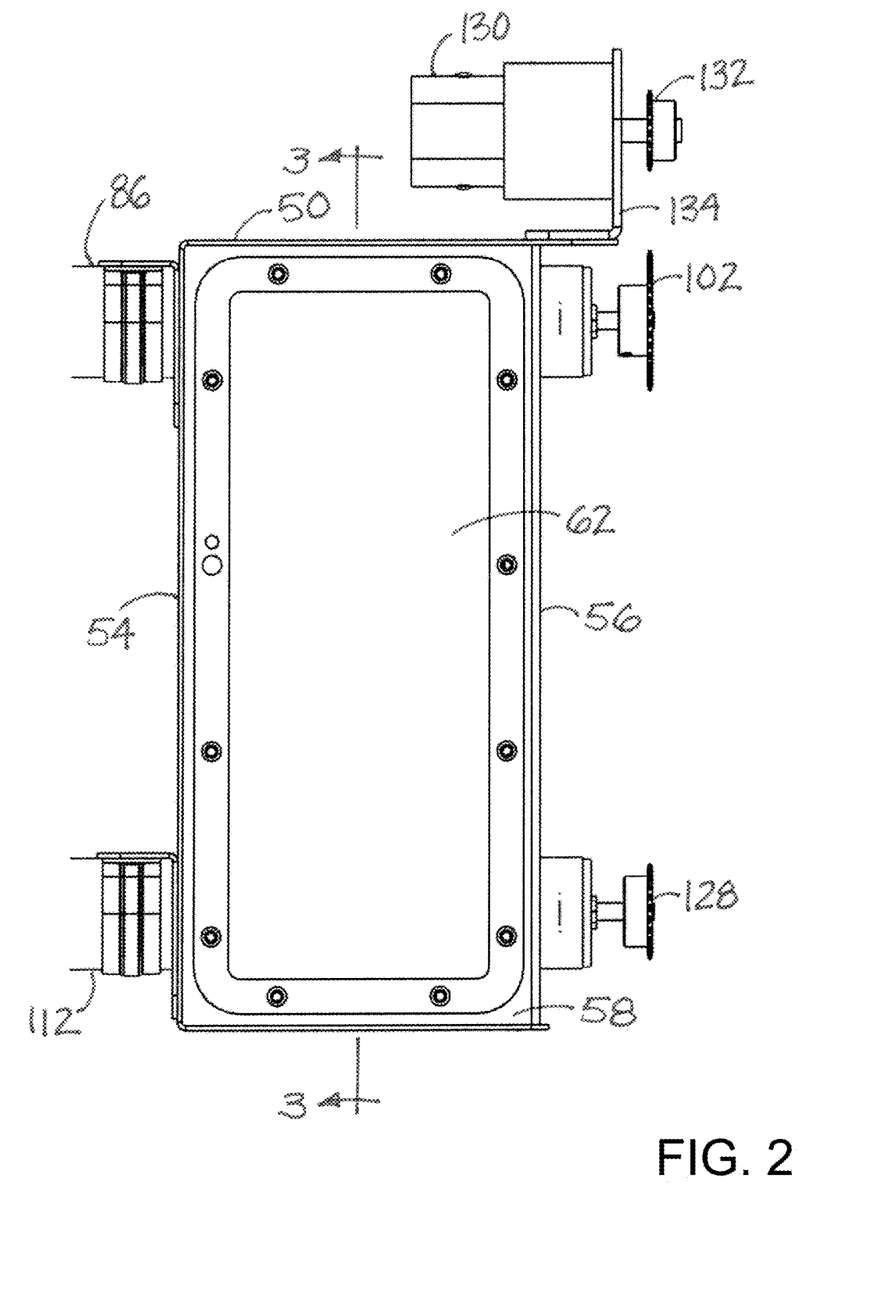
FIG. 2 is a schematic and view of the apparatus, according to an illustrative embodiment.
Figure 3:
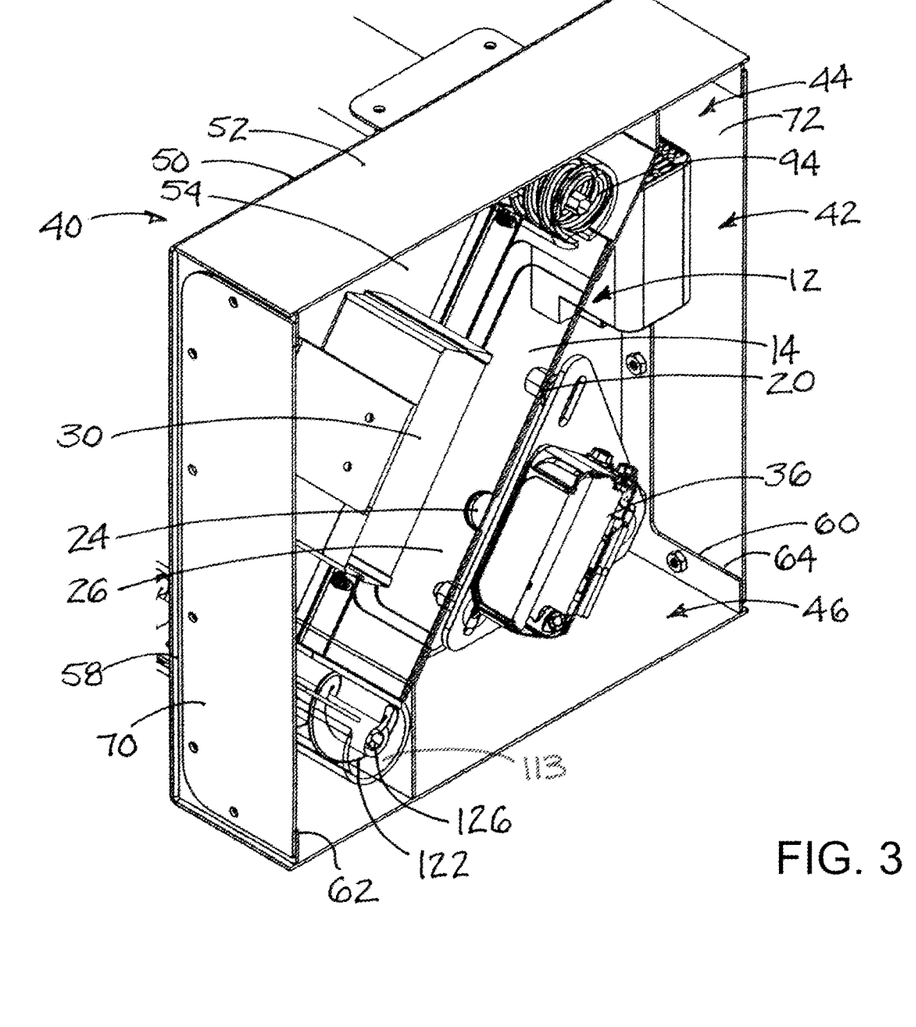
FIG. 3 is a schematic perspective sectional view of the apparatus taken along line 3-3 of FIG. 2, according to an illustrative embodiment.
Figure 4:
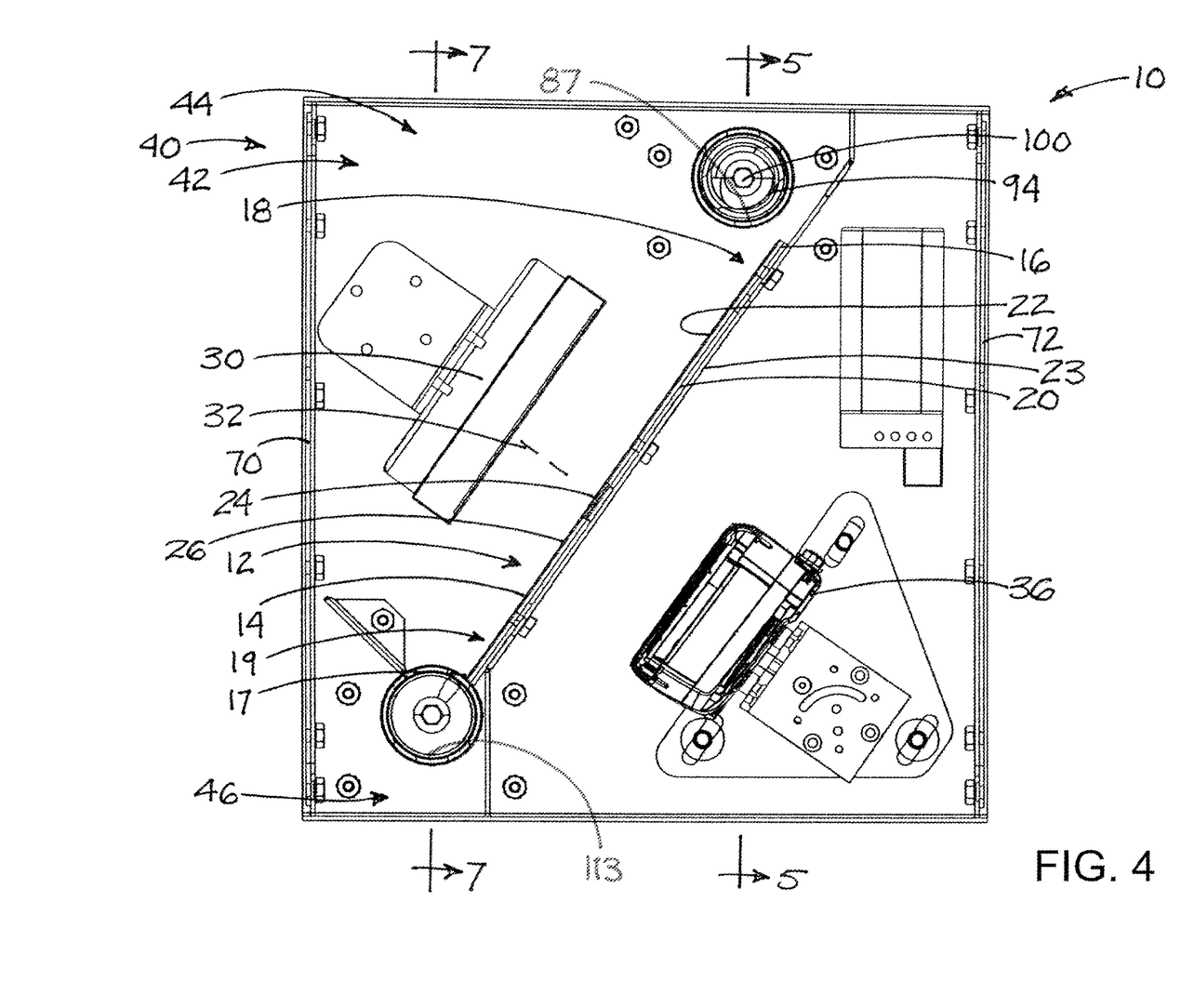
FIG. 4 is a schematic side sectional view of the apparatus taken along line 3-3 of FIG. 2, according to an illustrative embodiment.
Figure 5:
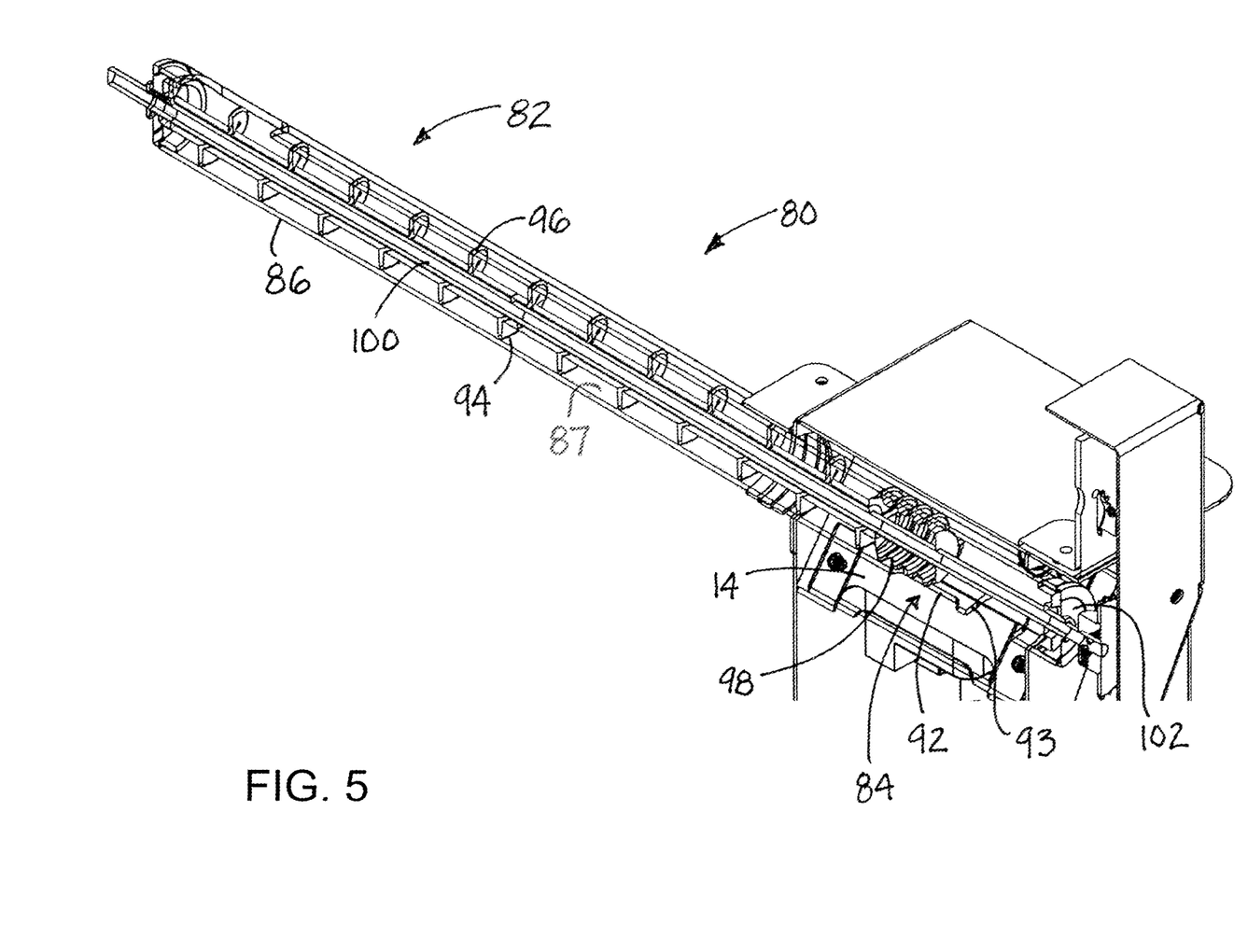
FIG. 5 is a schematic sectional view of the apparatus taken along line 5-5 of FIG. 4, according to an illustrative embodiment.
Figure 6:
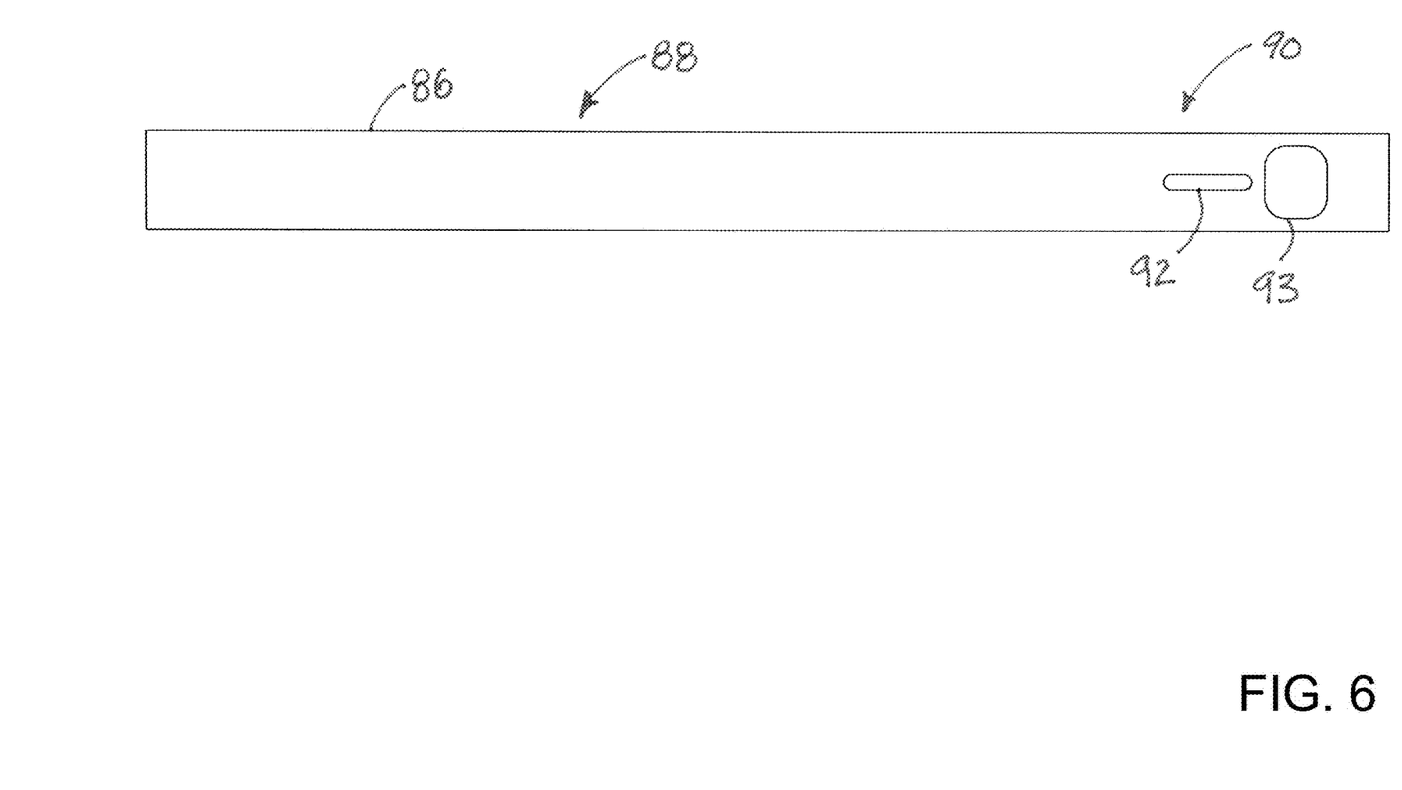
FIG. 6 is a schematic bottom view of the diverting tube of the diverting assembly, according to an illustrative embodiment.
Figure 7:
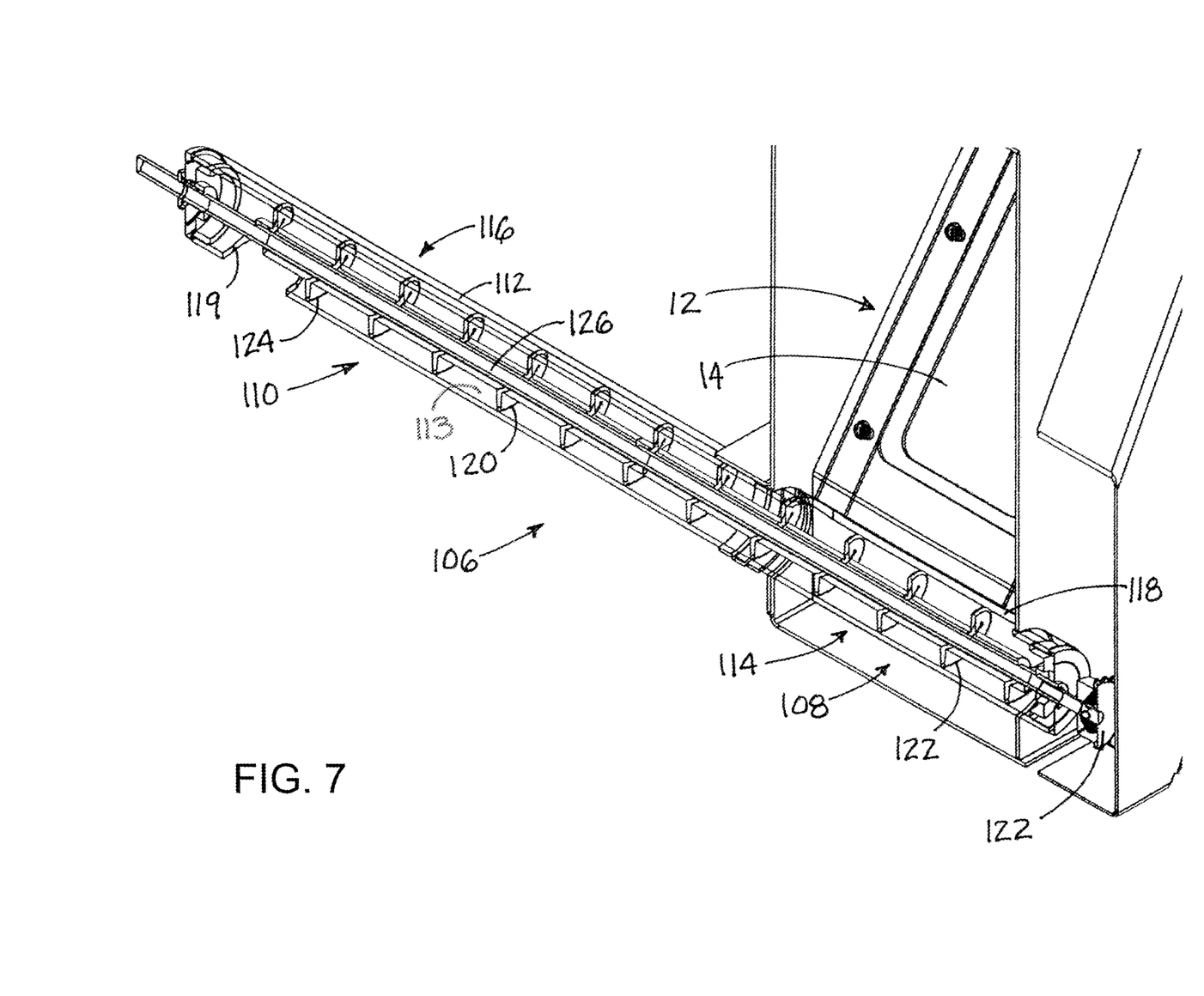
FIG. 7 is a schematic sectional view of the apparatus taken along line 7-7 of FIG. 4, according to an illustrative embodiment.
Figure 8:
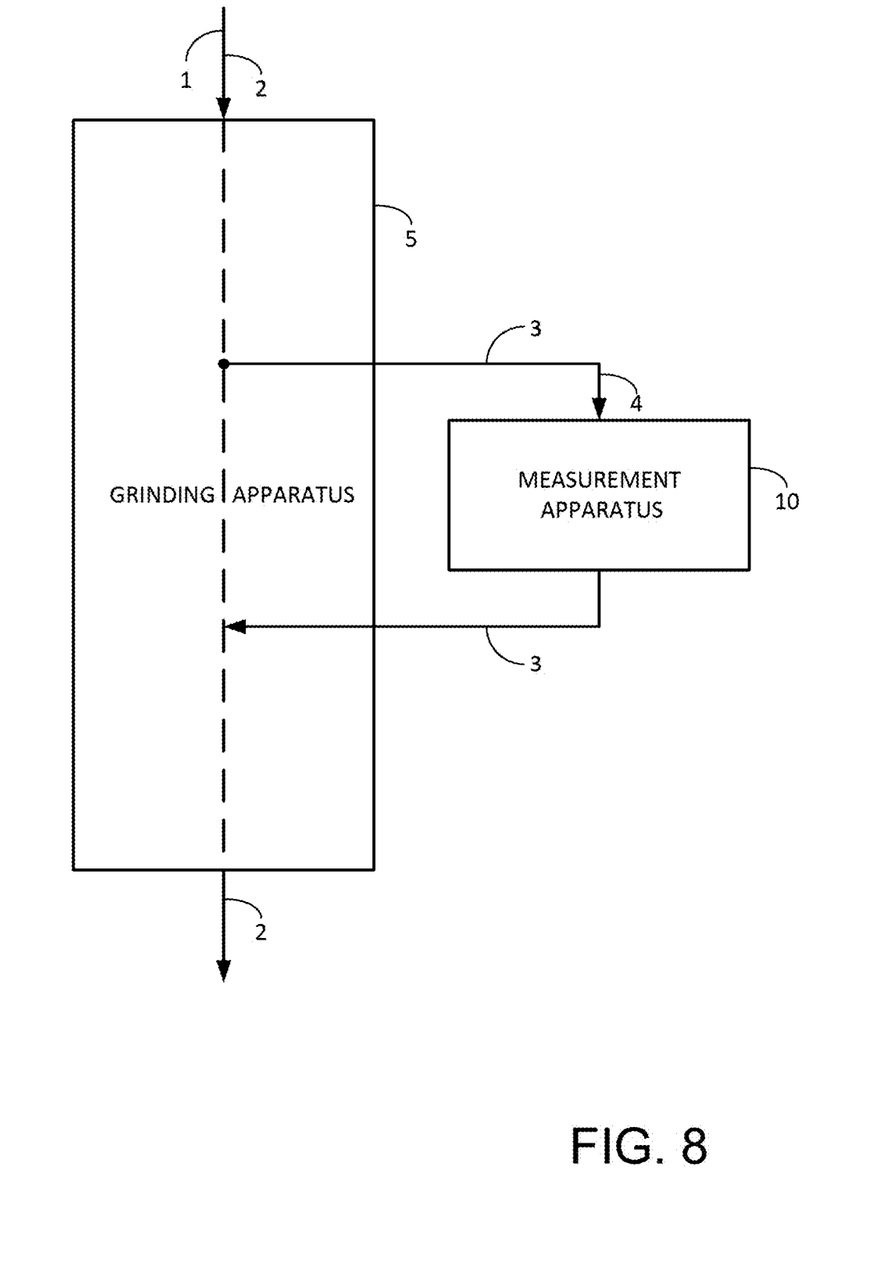
FIG. 8 is a schematic diagram of the movement of particles in a system including the apparatus, according to an illustrative embodiment.

In at least one aspect, the disclosure relates to an apparatus 10 for sensing or measuring characteristics of particles 1 in a flow 2 of particles. The flow 2 may be continuous or substantially continuous such that characteristics of the particles 1 may be measured continuously, substantially continuously, or periodically. In one illustrative application of the apparatus 10, the flow 2 of particles moves through a grinding apparatus 5 configured to reduce the size of material, such as grain, to smaller sizes by moving the material through a gap between grinding rolls. Suitably, a relatively smaller stream 3 of particles may be drawn or diverted from the relatively larger flow 2 of particles moving through the grinding apparatus in order to provide a sample of the particles 1 to the apparatus 10 for sensing one or more characteristics of the particles. The stream 3 of particles may move along a path 4 which is at least partially defined by the apparatus 10. In some embodiments, the stream 3 of particles may be returned to the flow 2 of particles after the particles have passed through elements of the apparatus 10 and characteristics of the particles have been sensed by elements of the apparatus. Thus, the path 4 may originate or begin at a point along the movement path of the flow 2 of particles and may terminate or and at a point along the movement path of the flow of particles. The origin of the path 4 may be at any point along the stream 3, such as, for example, after all grinding processing has been applied to the particles, after some of the grinding processing has been applied to the particles, or even prior to any of the grinding processing being applied to the particles.

In greater detail, the apparatus 10 may include a guidance structure 12 which may be configured to guide movement of particles of the stream 3 of particles along at least a portion of the path 4 of particles defined by the apparatus 10. The guidance structure 12 may define an inclined surface 14 across which particles of the stream 3 of particles move along the path 4. At least a portion of the inclined surface 14 may be substantially planar in shape such that particles moving across or along the surface 14 move in a plane oriented substantially parallel to the plane of the surface 14. A planar inclined surface 14 may present few or no obstacles to particle movement in a downward direction across the surface 14. A plane defined by the planar portion of the inclined surface 14 may be inclined with respect to a horizontal plane, and in the angle of inclination may be selected from those angles suitable to maintain the particles moving along the path 4 in contact with the surface 14 with minimal movement off of the surface. Illustratively, the plane of the inclined surface 14 may be inclined downwardly from the horizontal at an angle in the range of approximately 30 degrees to approximately 70 degrees.

The inclined surface 14 may have an upper end 16 and a lower end 17 positioned at a relatively lower vertical level than the upper end. An upper portion 18 of the surface 14 may extend downwardly from the upper end 16 toward the lower end 17, and a lower portion 19 of the surface 14 may extend upwardly from the lower end 17 toward the upper end 16. The upper portion 18 may thus be positioned at a relatively higher vertical level than the lower portion 18. The guidance structure 12 may include an inclined support 20 with an upper surface 22 which forms at least a portion of the inclined surface 14, and a lower surface 23 opposite of the upper surface 22 on the support 20.

In some embodiments, the inclined support 20 may include a sensing region 24 of the inclined surface 14 which is configured to transmit light through the support 20 at the region 24. In some embodiments, the sensing region 24 may be optically translucent, and in embodiments the sensing region may be optically transparent. The sensing region 24 may be generally centrally located on the inclined surface 14, and also may be generally centrally located on the inclined support. Illustratively, the sensing region 24 may be substantially circular in shape in the plane defined by the inclined surface, although other configurations and shapes may be utilized. The inclined support 20 may also include a peripheral region 26 of the inclined surface 14 which is located adjacent to the sensing region 24, and may be relatively opaque to light passage therethrough as compared to the light transmissibility of the sensing region. The peripheral region 26 may surround the sensing region 24, and may extend toward the upper end 16 and the lower end 17 of the inclined surface from the sensing region. The sensing region 24 may thus effectively form a transparent or translucent "window" in the relatively more opaque peripheral region 26.

Figure 9:
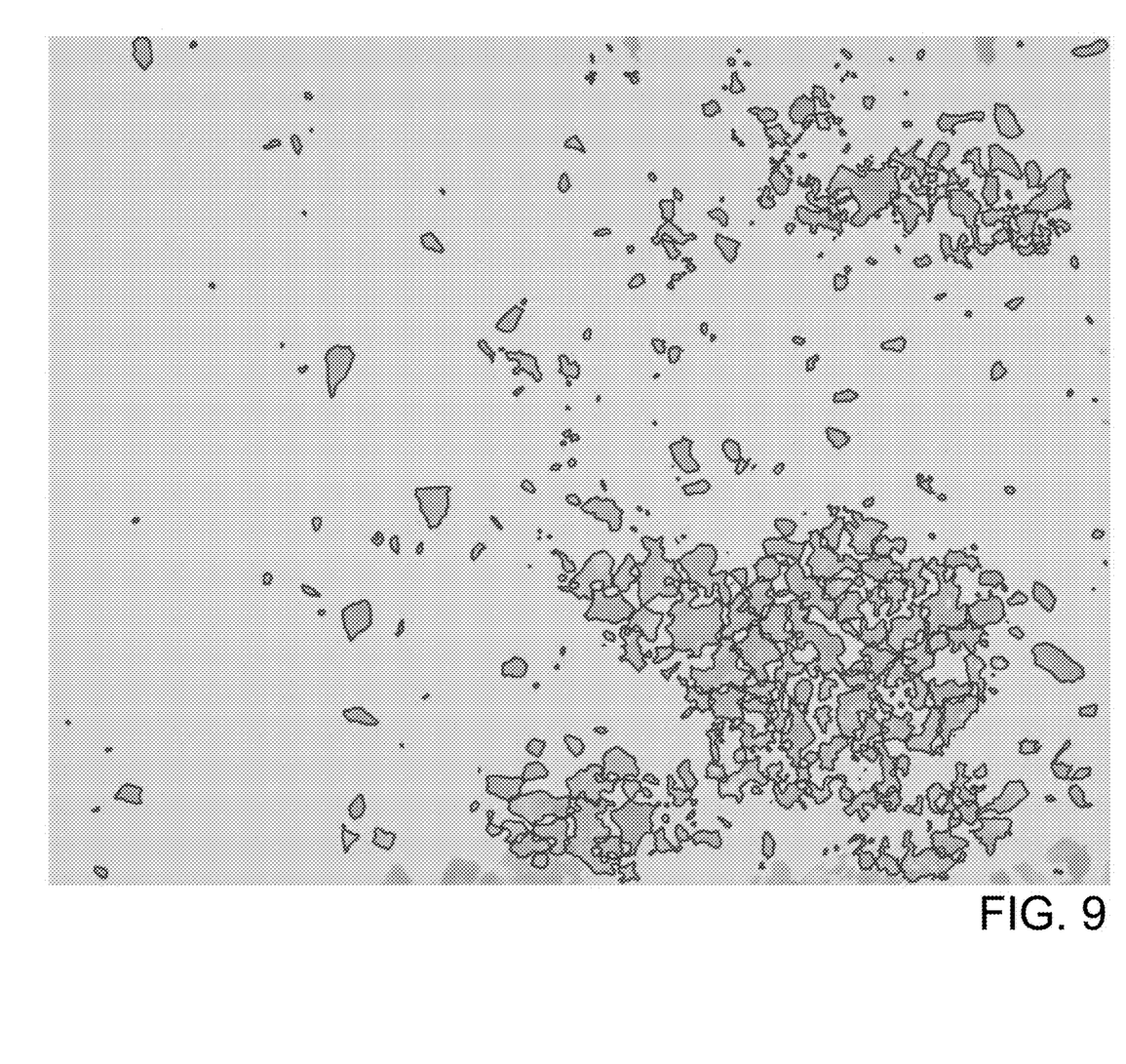
FIG. 9 is a schematic example of a captured image of particle moving across the inclined surface, with an illustrative overlay of the boundaries of the particles applied by boundary recognition software.

The apparatus 10 may further include an image capturing device 30 that is configured to capture at least one image of particles located on or adjacent to the inclined surface 14. The image capturing device 30 may be oriented with respect to the inclined support 20 to capture one or more images of particles passing over the sensing region 24 of the support. The image capturing device 30 may have a focal axis 32 which may be oriented substantially perpendicular to the inclined surface 14, and may further be oriented oblique to the horizontal plane. In some embodiments, the image capturing device 30 may comprise a camera, and the camera may be capable of sensing and capturing high-definition images of the particles. In some implementations, the image capturing device 30 may utilize any suitable imaging technology for capturing images of the particles on the path 4. A processor utilizing boundary recognition or detection software may receive images of the particles moving across the inclined surface from the image capturing device and assign boundaries to the particle images. Based upon the assigned boundaries of the particle images, characteristics may be detected and measured. Such characteristics may include, for example, size characteristics such as dimensions (e.g., width dimensions and length dimensions), and shape characteristics such as roundness and sphericity. Based upon the images of the particles and the sensed boundaries, values may be assigned to the various characteristics and those values may be subjected to statistical analysis for the purposes of determining, for example, particle size averages and standard deviations.

The apparatus 10 may also include a light source 36 configured to emanate or project light through at least a portion of the inclined surface 14 to facilitate the detection of the outer boundaries or profiles of particles on the surface 14 in images captured by the image capturing device 30. The light source 36 may be configured to shine light through the sensing region 24 of the inclined support 20, and the light source may be positioned below the sensing region of the support 20 and configured to direct light through the support 20 and through the upper surface 22 such that the particles, or at least the profiles of the particles, are illuminated by light passing through the region 24. In some embodiments, the light source 36 may be positioned in opposition to the image capturing device 30 with respect to the inclined surface 14. Illustratively, the light source 36 may be configured to direct light generally along the focal axis 32 of the image capturing device.

In some embodiments, a housing 40 may be provided as a part of the apparatus 10 for housing or enclosing at least some of the elements of the apparatus 10. The housing 40 has an interior 42 which may be fully enclosed, and the inclined surface 14 of the guidance structure 12 may be positioned in the housing interior. The inclined surface 14 may extend across a portion of the interior 42. The interior 42 of the housing has a top 44 and a bottom 46, and the upper portion 18 of the inclined surface 14 may be located toward the top 44 of the interior and the lower portion 19 of the inclined surface may be located toward the bottom 46 of the interior.

In the illustrative embodiments, the housing 40 may comprise a fixed panel portion 50 and, for housings having one or more access openings, the housing may also include one or more removable access panel portions 70. In greater detail, the fixed panel portion 50 may have a top section 52, a pair of broad side sections 54, 56 which extend generally downwardly from the top section, and a pair of end sections 58, 60 which extend generally between the side sections. The fixed panel portion 50 may have at least one access opening, and in some embodiments of the housing may have a plurality of access openings 62, 64 through the fixed panel portion. Illustratively, a first access opening 62 may be located generally over the upper surface 22 of the inclined support 20, and may be located on one of the end sections 58 of the fixed panel portion 50. A second access opening 64 may be located generally below the lower surface 24 of the inclined support 20, and may be located on another one of the end sections 60 of the fixed panel portion 50. Other access openings may be provided, and may be located, for example on one of the side sections 54, 56 of the fixed panel portion 50.

The housing 40 may include one or more axis panel portions 70 with each of the access panel portions being associated with one of the access openings. Each of the access panel portions 70 may be secured to the fixed panel portion over an associated one of the access openings. Illustratively, a first access panel portion 70 may be positioned over the first access opening 62, and a second axis panel portion 72 may be positioned over the second access opening 64. It will be evident to those skilled in the art that more or fewer access openings, and corresponding access panel portions, may be utilized as compared to those set forth in this disclosure.

The apparatus 10 may also include a diverting assembly 80 which is configured to carry the stream 3 of particles diverted from the flow 2 of particles to the inclined surface 14. Generally, the diverting assembly 80 may have a transport portion 82 for transporting the particles of the stream 3 from the flow to the housing 40, and may also have a dispensing portion 84 for dispensing the particles of the stream 3 onto the inclined surface after the stream 3 has moved from the transport portion to the dispensing portion.

The diverting assembly 80 may include a diverting tube 86 configured to carry particles of the stream 3 along a diverting surface 87 to the inclined surface 14. The diverting tube 86 may be mounted on the housing 40, and may extend at least partially into the interior 42 of the housing, such as into the top 44 of the interior of the housing. The diverting tube 86 may have a transport section 88 corresponding to the transport portion 82 of the diverting assembly and a dispensing section 90 corresponding to the dispensing portion 84 of the diverting assembly. Illustratively, the transport section 88 may be generally located exterior of the housing 40, and the dispensing section 90 may be located in the interior 42 of the housing. The dispensing section 90 may be located adjacent to the upper end 16 of the inclined surface 14, and an opening 92 in the section 90 of the tube 86 may permit particles in the tube 86 to exit the diverting tube and fall onto the inclined surface 14. The opening 62 may be located on a lower side of the diverting tube 86. Optionally, an auxiliary opening 93 may be provided in the dispensing section 90 of the diverting tube 86 to provide an outlet for any particles that remain in the interior of tube 86 beyond the opening 62 such that particles which do not fall through the opening 92 do not accumulate in the end of the tube 86.

The diverting assembly 80 may further include a diverting auger 94 positioned in the diverting tube 86, and the auger 94 may have a transport section 96 corresponding to the transport portion 82 of the diverting assembly and a dispensing section 98 corresponding to the dispensing portion 84. In some embodiments, the pitch of the auger 94 in the transport section 96 may be greater than the pitch of the auger in the dispensing section, and in particular proximate to the opening 92 in the diverting tube 86 to promote or uniform distribution of the particles across the inclined surface 14. The diverting auger 94 may be mounted on a diverting auger shaft 100 such that the auger 94 and the auger shaft 100 rotate as a unit. The diverting auger shaft 100 may extend through, and be rotatable with respect to, the diverting tube. The diverting auger shaft 100 may extend through one of the side sections 54 of the fixed panel portion of the housing, and a first driven pulley 102 may be mounted on the auger shaft 100 such that rotation of the pulley 102 causes rotation of the shaft 100 as well as the auger 94 with respect to the tube 86.

The apparatus 10 may further include a returning assembly 106 that is configured to rejoin the stream 3 of particles to the flow 2 of particles. The returning assembly 106 may have a collecting portion 108 for collecting the particles moving over the inclined surface 14 after having passed by the image capturing device 30, and also an outlet portion 110 for moving the particles of the stream 3 collected by the collecting portion 108 back toward the particles of the flow 2.

The returning assembly 106 may include a returning tube 112 configured to carry particles collected from the inclined surface 14 away from the inclined surface along a returning surface 113, and may be mounted on the housing 40. The returning tube 112 may extend at least partially out of the interior 42 of the housing with a portion in the interior, such as at the bottom 46 of the interior of the housing. The returning tube 112 may have a collecting section 114 corresponding to the collecting portion 108 of the returning assembly and an outlet section 116 corresponding to the outlet portion 110 of the assembly 106. The outlet section 116 may be located exterior of the housing interior 42 and the collecting section 114 may be located in the housing interior 42. The collecting section 114 may have a collecting opening 118 which may be positioned with respect to the inclined surface 14 in a manner that permits particles on the inclined surface to enter the returning tube. The collecting opening 118 may be located on an upper side of the returning tube. The collecting opening 118 may be located adjacent to the lower end 17 of the inclined surface 14. The lower end 17 may be positioned over the collecting opening 118 to permit particles falling from the lower end 17 to fall into the collecting opening. The returning tube 112 may also have an outlet opening 119 in the outlet section 116 which permits particles to exit the returning tube 112 to rejoin the flow 2. The outlet opening 119 may be located on a bottom side of the returning tube 112.

The returning assembly 106 may further include a returning auger 120 positioned in the returning tube 112. The returning auger may have a collecting section 122 corresponding to the collecting portion 108 of the returning assembly and an outlet section 124 corresponding to the outlet portion 110 of the returning assembly. The pitch of the returning auger in the collecting section 122 may be substantially the same as the pitch of the auger in the outlet section 124. The returning assembly 106 may have a returning auger shaft 126 on which the auger 120 is mounted such that the auger and the auger shaft rotate as a unit. The returning auger shaft 126 may extend through the returning tube 112 and may be rotatable with respect to the tube 112. The returning auger shaft 126 may extend through one of the side sections 54 of the fixed panel portion of the housing, and a second driven pulley 128 may be mounted on the returning auger shaft such that rotation of the pulley 128 causes rotation of the shaft 126 as well as the auger 120.

The apparatus 10 may also include a motor 130 configured to operate the augers 94, 120 of the diverting and returning assemblies. The motor 120 may have a motor shaft which is rotated during operation of the motor, and a driver pulley 132 may be mounted on the motor shaft. The driver pulley 132 and the driven pulleys 102, 128 may be connected in any suitable manner in order to transfer the rotation of the driver pulley to the driven pulleys. For example, the driver pulley and the first and second driven pulleys may comprise chain sprockets, and a chain may link the sprockets together to transmit the rotational motion between the sprockets. The motor 130 may be mounted on the housing 40, and a motor support 134 may mount the motor on the housing.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An apparatus for sensing characteristics of particles in a flow of particles moving through a grinding apparatus by removing a stream of particles taken from the flow of particles for sensing by the apparatus for sensing and returning the stream of particles to the flow of particles in the grinding apparatus, the apparatus for sensing characteristics comprising:

a guidance structure configured to guide particles of the stream of particles taken from the flow of particles from the grinding apparatus, the guidance structure including an inclined support with opposite surfaces, an upper one of the opposite surfaces of the inclined support having an upper portion and lower portion, the upper surface being an inclined surface which is inclined downwardly with respect to a horizontal orientation from the upper portion of the inclined surface to the lower portion of the inclined surface such that particles of the stream of particles contacting the upper portion are moved by gravity along the inclined surface toward the lower portion, the inclined support having a region translucent to light;

a light source positioned adjacent to a first one of the opposite surfaces of the inclined support to project light through the translucent region of the inclined support to illuminate boundaries of particles moving along the inclined surface;

an image capturing device positioned adjacent to a second one of the opposite surfaces of the inclined support configured to capture at least one image of the illuminated boundaries of particles moving along the inclined surface over the translucent region of the inclined support;

a diverting assembly configured to divert to the inclined surface the stream of particles from the flow of particles from the grinding apparatus, the diverting assembly including at least one element configured to push the particles of the flow of particles along a diverting surface and toward the inclined surface of the inclined support; and a returning assembly configured to collect particles of the stream of particles from the inclined surface for rejoining the stream of particles to the flow of particles from the grinding apparatus, the returning assembly including at least one element configured to push the particles of the flow of particles along a returning surface and away from the inclined surface of the inclined support after the particles have fallen from the inclined surface.

2. The apparatus of claim 1 wherein the first surface of the inclined support forms a lower surface of the inclined support and the second surface of the inclined support forms the upper surface of the inclined support.

3. The apparatus of claim 1 wherein the light source is positioned in opposition to the image capturing device with the inclined surface positioned between the light source and the image capturing device.

4. The apparatus of claim 1 wherein the translucent region of the inclined support comprises a sensing region and the inclined support additionally comprises a peripheral region located adjacent to the sensing region and being opaque to light.

5. The apparatus of claim of claim 4 wherein the sensing region is optically transparent.

6. The apparatus of claim 1 additionally comprising a housing having an interior, the inclined surface of the guidance structure being positioned in the housing.

7. The apparatus of claim 1 wherein the diverting assembly comprises:
a diverting tube configured to carry particles to the inclined surface;
a diverting auger positioned in the diverting tube; and
a diverting auger shaft on which the diverting auger is mounted such that the diverting auger and the diverting auger shaft rotate as a unit, the diverting auger and the diverting auger shaft extending through the auger tube and being rotatable with respect to the auger tube;
wherein the diverting assembly comprises:
a diverting tube configured to carry particles to the inclined surface;
a diverting auger positioned in the diverting tube; and
a diverting auger shaft on which the diverting auger is mounted such that the diverting auger and the diverting auger shaft rotate as a unit, the diverting auger and the diverting auger shaft extending through the auger tube and being rotatable with respect to the auger tube.

8. The apparatus of claim 1 wherein the inclined surface is substantially planar in shape.

9. The apparatus of claim 1 wherein the first and second surfaces of the inclined support are each planar in shape.

10. An apparatus for sensing characteristics of particles in a flow of particles, the apparatus comprising:
a guidance structure configured to guide particles of a stream of particles taken from the flow of particles, the guidance structure including an inclined support with opposite surfaces, an upper one of the opposite surfaces of the inclined support having an upper portion and lower portion, the upper surface being an inclined surface-which is inclined downwardly with respect to a horizontal orientation from the upper portion of the inclined surface to the lower portion of the inclined surface such that particles of the stream of particles contacting the upper portion are moved by gravity along the inclined surface toward the lower portion, the inclined support having a region translucent to light;
a light source positioned adjacent to a first one of the opposite surfaces of the inclined support to project light through the translucent region of the inclined support to illuminate boundaries of particles moving along the inclined surface;
an image capturing device positioned adjacent to a second one of the opposite surfaces of the inclined support configured to capture at least one image of the illuminated boundaries of particles moving along the inclined surface over the translucent region of the inclined support; and
a diverting assembly configured to divert the stream of particles from the flow of particles to the inclined surface, the diverting assembly comprising:
a diverting tube configured to carry particles to the inclined surface;
a diverting auger positioned in the diverting tube; and
a diverting auger shaft on which the diverting auger is mounted such that the diverting auger and the diverting auger shaft rotate as a unit, the diverting auger and the diverting auger shaft extending through the auger tube and being rotatable with respect to the auger tube.

11. The apparatus of claim 10 wherein the diverting auger has a transport section and a dispensing section, a pitch of the auger of the transport section being greater than a pitch of the auger of the dispensing section.

12. An apparatus
for sensing characteristics of particles in a flow of particles, the apparatus comprising:
a guidance structure configured to guide particles of a stream of particles taken from the flow of particles, the guidance structure including an inclined support with opposite surfaces, an upper one of the opposite surfaces of the inclined support having an upper portion and lower portion, the upper surface being an inclined surface-which is inclined downwardly with respect to a horizontal orientation from the upper portion of the inclined surface to the lower portion of the inclined surface such that particles of the stream of particles contacting the upper portion are moved by gravity along the inclined surface toward the lower portion, the inclined support having a region translucent to light;
a light source positioned adjacent to a first one of the opposite surfaces of the inclined support to project light through the translucent region of the inclined support to illuminate boundaries of particles moving along the inclined surface;
an image capturing device positioned adjacent to a second one of the opposite surfaces of the inclined support configured to capture at least one image of the illuminated boundaries of particles moving along the inclined surface over the translucent region of the inclined support;
a diverting assembly configured to divert the stream of particles from the flow of particles to the inclined surface; and
a returning assembly configured to collect particles of the stream of particles from the inclined surface for rejoining the stream of particles to the flow of particles, the diverting assembly comprising:
a returning tube configured to carry particles collected from the inclined surface;
a returning auger positioned in the returning tube; and
a returning auger shaft on which the auger is mounted such that the returning auger and the returning auger shaft rotate as a unit, the returning auger and the returning auger shaft extending through the auger tube.

* * * * *